United States Patent [19]

Kitao et al.

[11] Patent Number: 4,497,724
[45] Date of Patent: Feb. 5, 1985

[54] SOLAR ENERGY STORAGE MATERIALS

[75] Inventors: Teijiro Kitao, Tondabayashi; Jun-ichiro Setsune, Sakai; Shoichi Ishihara, Katano; Ryoichi Yamamoto, Neyagawa, all of Japan

[73] Assignee: Matsushita Electric Industrial Co., Ltd., Osaka, Japan

[21] Appl. No.: 490,202

[22] Filed: Apr. 29, 1983

[30] Foreign Application Priority Data

May 11, 1982 [JP] Japan ................................. 57-79351

[51] Int. Cl.$^3$ .............................................. C09K 5/00
[52] U.S. Cl. .................................... 252/70; 126/452; 126/900
[58] Field of Search ................... 252/70; 126/452, 900

[56] References Cited

U.S. PATENT DOCUMENTS 3,715,212  2/1973  Ross ..................................... 430/343
4,105,014  8/1978  Schwerzel et al. .................. 126/452

FOREIGN PATENT DOCUMENTS 85392     8/1983   European Pat. Off. .
8342666   3/1983   Japan .
1554192  10/1979   United Kingdom .

OTHER PUBLICATIONS

Scharf et al., "Criteria for Efficiency, Stability and Capacity of an Abiotic Photochemical Solar Energy Storage System", Angew. Chem. 1979, 91(9), 696–707.

Primary Examiner—Paul Lieberman
Assistant Examiner—Robert A. Wax
Attorney, Agent, or Firm—Stevens, Davis, Miller & Mosher

[57] ABSTRACT

This invention relates to a solar energy storage material comprising N,N'-bis(phenylacetyl)indigo dissolved in a polar solvent. Of the indigo derivatives capable of storing the solar energy by the photoisomerization from trans-isomer to cis-isomer of the molecule, all of the compounds obtained so far had an energy storage capacity of only 30 cal or less per 1 g of the compound and also a high thermal isomerization rate from cis form to trans form in solution. Thus, they cannot be called a solar energy storage material of practical value.

In the case of the present invention, on the other hand, when N,N'-bis(phenylacetyl)indigo is dissolved in a polar solvent such as acetonitrile, it is possible to store about 60 cal of energy per 1 g of N,N'-bis(phenylacetyl)indigo, and the half-life period of isomerization from cis to trans from in acetonitrile at 17° C. is 1,264 minutes, which is also a satisfactory value for practical application.

3 Claims, 2 Drawing Figures

SOLAR ENERGY STORAGE MATERIALS

FIELD OF THE INVENTION

This invention relates to a solar energy storage material containing N,N'-diacylindigo capable of storing the energy of light by trans-cis isomerization.

The utilization of solar energy has been studied extensively as a clear and inexhaustible energy source. General methods of utilizing the solar energy include (1) utilization of solar heat, (2) utilization of solar light, and (3) utilization of solar energy after it has been converted into other forms of natural energy such as wind force, temperature difference of sea water in the ocean, or biomass. Much attention has been concentrated to the study of biomass or chemical storage of photo-energy as promising means for storing solar energy in a simple manner for a long period of time after collecting the energy.

Methods for chemical storage of photo-energy can be classified broadly into the following groups: (1) energy conversion by photodissociation, (2) energy storage by photoisomerization between cis- and trans-forms of olefin compounds, (3) energy storage by photocycloaddition in $\pi$-electron system, (4) energy storage by hydrogen production from water, and others.

DESCRIPTION OF THE PRIOR ART

For purposes of this invention, each symbol has the meaning as follows:

T ... Trans-isomer, C ... Cis-isomer, $\Delta E$ ... Storable energy, $\Delta E_R$ ... Activation energy of isomerization from cis- to trans-isomer, $\Delta E_F$ ... Activation energy of isomerization from trans- to cis-isomer.

Figure 1:
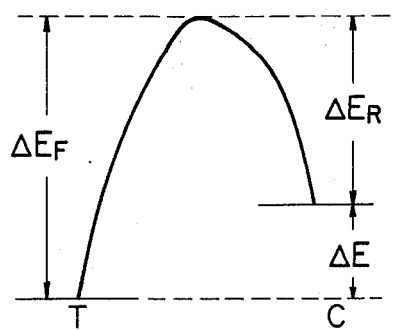
FIG. 1 is a graph illustrating the principle of energy storage by photoisomerization between trans- and cis-forms of an olefin compound.

Of the methods mentioned above, the energy storage by photoisomerization between trans- and cis-forms of an olefin will be explained with reference to FIG. 1. The trans-isomer (T), which has a lower energy level and is more stable thermodynamically, is excited to an electronically high-energy state by absorption of the solar energy. The value of the energy required for this excitation is larger than that of the activation energy ($\Delta E_F$) of forward reaction, but is preferably as small as possible in order that the infrared region of the solar spectrum can be also utilized effectively.

The photo-excited trans-isomer (T) soon emits heat and is transformed into the cis-isomer (C) which has a higher energy level and is thermodynamically more unstable than T. The difference between the energy level of trans-isomer (T) and that of cis-isomer (C) is the storable energy ($\Delta E$).

Methods of releasing the stored energy ($\Delta E$) as heat include a method to add a heat trigger and a method to use a catalyst. In the former method, the stored energy ($\Delta E$) can be recovered by applying to the cis-isomer (C) an amount of thermal energy larger than the reverse activation energy ($\Delta E_R$). In the latter method, the recovery of $\Delta E$ can be effected by the catalyst reducing $\Delta E_R$ and helping the reverse reaction from (C) to (T) to proceed easily. Known catalysts include neutral deactivated alumina, barium oxide, lead oxide, zinc oxide, p-toluenesulfonic acid and many other substances. Thus, the principle itself is known publicity of the energy storage by the photoisomerization between trans- and cis-forms of an olefin compound. Also, apparatuses for energy recovery utilizing the principle have been proposed already (Japanese Patent Application "Kokai" (Laid-open) Nos. 80278/77 and 65265/78).

However, a problem exists in that it is not possible by use of previously known materials to collect the solar energy effectively and to store an amount of energy equal to or larger than that (50 cal/g) corresponding to the sensible heat of water between 20° C. and 70° C. Another problem in practical utilization is that the rate of thermal isomerization from cis- to trans-form is high in those materials known previously.

Various olefin compounds are known to collect the solar energy by trans-cis isomerization, including stilbene, azobenzene, indigo, thioindigo, cyanine-type dyes, and many other materials. Indigo dyes and cyanine dyes are preferred from the consideration of their small susceptibility to photodegradation and the matching of absorption spectra of these materials and the solar spectrum.

Typical indigo dyes having an energy storing capacity are represented by the following structural formula

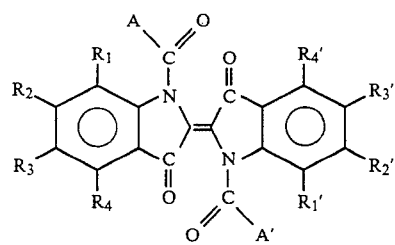

wherein A and A' are each a lower alkyl, haloalkyl, aryl or haloaryl group; $R_1$, $R_1'$, $R_2$, $R_2'$, $R_3$, $R_3'$, $R_4$ and $R_4'$ are each a hydrogen or halogen atom or an alkyl, aryl, alkoxy, aryloxy, alkoxy, or aroyl group, or a combination thereof. For example, N,N'-diacetylindigo has an energy storing capacity of 34.5 KJ/mol; those of N,N'-bis(monochloroacetyl)indigo, N,N'-diisobutylindigo and N,N'-dipropionylindigo are 48, 41 and 27.5 KJ/mol, respectively.

All these compounds, however, have an energy storing capacity of less than 30 cal per 1 g of N,N'-diacylindigo. Moreover, the half-life period of thermal isomerization from cis to trans form in benzene at 17° C. (the time required for the proportion of cis form in solution to reach one half of the original value) is 186 minutes for N,N'-diacetylindigo, 413 minutes for N,N'-diisobutyrylindigo and 642 minutes for N,N'-dipropionylindigo. Accordingly, these compounds cannot be called as a practically useful material.

SUMMARY OF THE PRESENT INVENTION

The object of this invention is to provide, in view of the previous examples mentioned above, a solar energy storage material containing a N,N'-diacylindigo which is capable of storing 50 cal or more of energy per 1 g of the N,N'-diacylindigo and has a low thermal isomerization rate from cis- to trans-form.

DESCRIPTION OF THE INVENTION

This invention relates to a solar energy storage material comprising N,N'-bis(phenylacetyl)indigo dissolved in a polar solvent.

According to this invention, it is possible to store 50 cal or more of energy per 1 g of N,N'-bis(phenylacetyl)indigo and to decrease greatly the thermal isomerization rate from cis-form to trans-form as compared with a case where a nonpolar solvent such as benzene or carbon tetrachloride is used as the solvent.

Examples of the polar solvents used in this invention for dissolving N,N'-bis(phenylacetyl)indigo as the solar energy storage material include water; aliphatic alcohols such as methanol and ethanol; aromatic phenols such as phenol; aliphatic ketones such as acetone, methyl ethyl ketone and butyl methyl ketone; esters such as ethyl acetate; aliphatic nitriles such as acetonitrile and propionitrile; aromatic nitriles such as benzonitrile; aromatic aldehydes such as benzaldehyde; aliphatic nitro compounds such as nitromethane; aromatic nitro compounds such as nitrobenzene; aliphatic acid halides such as acetyl chloride; alkyl halides such as ethyl bromide and ethyl iodide; aromatic halohydrocarbons such as chlorobenzene; aromatic amines such as aniline; tertiary amines such as pyridine; and aliphatic cyanides such as ethylene cyanide. It is needless to say that conventional polar solvents other than those mentioned above may also be used so long as they can dissolve the N,N'-diacylindigo and do not react with the indigo compound.

This invention will be illustrated in detail below with reference to Examples.

EXAMPLE 1

N,N'-Bis(phenylacetyl)indigo was synthesized and measured for the heat of isomerization and the rate of thermal isomerization from cis-form to trans-form after dissolved in acetonitrile.

A generally adopted method of synthesizing N,N'-diacylindigo is that of Blanco and Ross (J. Phys. Chem. 72, 2817 (1968)) which comprises heating indigo and a corresponding acid chloride in pyridine solvent with stirring. However, since N,N'-bis(phenylacetyl)indigo is difficult to synthesize by such a prior method, it was synthesized through O,O'-bis(phenylacetyl)leucoindigo, which can be synthesized relatively easily, by subsequent oxidative rearrangement thereof.

The method of synthesis was as shown below.

A mixture of 2.5 g of indigo and 30 ml of 95% ethanol through which $SO_2$ gas had been passed in advance, was refluxed with 2 g of zinc powder for two hours. The reaction mixture was then filtered under a nitrogen gas stream to remove the insolubles, and distilled under a reduced pressure to remove ethanol, yielding leucoindigo. The resulting leucoindigo was then mixed with 4 g of sodium acetate and 30 ml of deaerated acetone. To the mixture was added dropwise 6 ml of phenylacetyl chloride with stirring at room temperature under nitrogen atmosphere. The reaction mixture was stirred further for 30 minutes after completion of the dropwise addition, acetone was removed therefrom under a reduced pressure, methanol was added thereto, and the precipitated product was separated by filtration. The insoluble product was washed thoroughly with methanol and dried to yield 3.46 g of O,O'-bis(phenylacetyl)leucoindigo.

A solution of 1.5 g of O,O'-bis(phenylacetyl)leucoindigo, synthesized in the manner described above, in 40 ml of dimethyl sulfoxide was mixed with 750 mg of dichlorodicyanobenzoquinone, and stirred at a room temperature for about 3 hours. The mixture was then extracted with benzene. The resulting benzene solution was washed thoroughly with water, and benzene was removed therefrom under a reduced pressure to give a crude product of N,N'-bis(phenylacetyl)indigo. After drying, the crude product was purified by benzene-silica gel column chromatography to yield 1.24 g of N,N'-bis(phenylacetyl)indigo, purple in color, melting at 102°–103° C. (decomp.).

The data of infrared absorption spectra and nuclear magnetic resonance spectra obtained on the above products were as shown below.

| [O,O'-bis(phenylacetyl)leucoindigo] | |
|---|---|
| IR (KBr): | 3350 cm$^{-1}$ (NH) |
| | 1730 cm$^{-1}$ (C=O) |
| Hnmr (DMSO-$d_6$): | ∂ 11.90 (S) 2H (NH), |
| | 7.0 –7.7 (m) 18H (aromatics), |
| | 4.10 (S) 4H (—CH$_2$—) |
| [trans-N,N'—bis(phenylacetyl)indigo] | |
| IR (KBr): | 1710, 1680, 1600 cm$^{-1}$ (C=O) |
| Hnmr (CDCl$_3$): | ∂ 8.4 –7.3 (m) 18H (aromatics), |
| | 4.18 (S) 2H (—CH$_2$—) |

To 1 l of acetonitrile, was dissolved 0.135 g of said N,N'-bis(phenylacetyl)indigo prepared as described above to form a uniform solution. Upon irradiation of a halogen lamp light to this solution at 10° C. for about one hour through an aqueous potassium bichromate solution used as an optical filter, 65% of the N,N'-bis(phenylacetyl)indigo was found to have had isomerized from trans-form into cis-form. Then, the heat of isomerization of above-mentioned N,N'-bis(phenylacetyl)indigo was measured at 15° C. by use of Twin Isoperibol Colorimeter TIC-211 (made by Tokyo Riko & Co.).

In this Example, the isomerization from cis-form to trans-form was effected by the addition of a mixture of acetonitrile and hydrochloric acid as the catalyst. The percentage of cis-isomer of N,N'-bis(phenylacetyl)indigo before and after addition of the catalyst was 54% and 15.5%, respectively. It is considered that the difference, 38.5%, attributed to heat generation. Thermal energy may be applied in addition to the catalyst, or thermal energy alone may be applied in place of the catalyst.

The heat of isomerization determined above was 1.31 J per 100 ml of the solution after corrected for the heat evolved by the addition of the catalyst. Accordingly, the heat of isomerization of N,N'-bis(phenylacetyl)indigo synthesized in this Example was calculated to be about 125 KJ per 1 mol, exhibiting a very large value amounting to 3 to 4 times those of previously known N,N'-diacylindigos. When calculated based on 1 g of N,N'-bis(phenylacetyl)indigo, the compound can store about 60 cal. Thus, the compound has a great practical value as a solar energy storage material.

Meanwhile, the acetonitrile solution of N,N'-bis(phenylacetyl)indigo used above in this Example, in which about 60% of N,N'-bis(phenylacetyl)indigo had changed into cis-isomer, was employed to determine the thermal isomerization rate. The results were as shown in the following table.

TABLE

Change of proportion of cis-isomer with time in the dark at 17° C. of N,N'—bis(phenylacetyl) indigo (in acetonitrile)

| Time elapsed (sec) | Proportion of cis-isomer (%) |
|---|---|
| 0 | 59.6 |
| 674 | 59.2 |
| 2035 | 58.4 |
| 3030 | 57.9 |

As is apparent from the table, the thermal isomerization rate of N,N'-bis(phenylacetyl)indigo (in acetonitrile) is very low. Calculation based on the above table showed that the reaction constant k was $9.138 \times 10^{-6}$ sec$^{-1}$ and the half-life period was 1,264 minutes.

As shown in the foregoings, the solar energy storage materials of this invention can store about twice as much energy per 1 g of N,N'-diacylindigo as those of the materials known previously, has moreover, a low thermal isomerization rate of about ½ to 1/7 of those of the known materials, and is thus of great practical value.

COMPARATIVE EXAMPLE

Figure 2:
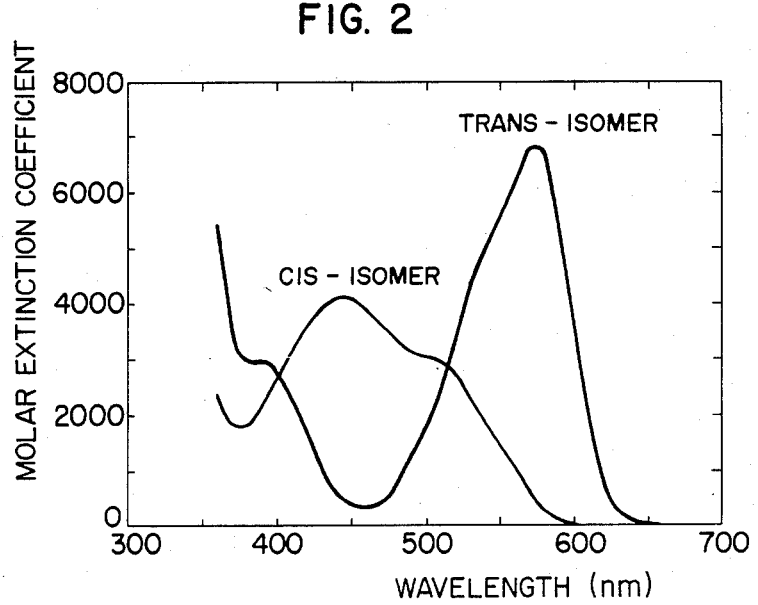
FIG. 2 is a graph showing the molar extinction coefficients of each of trans- and cis-forms of N,N'-bis(phenylacetyl)indigo as determined in benzene.

Into 1 l of benzene, was dissolved 0.181 g of N,N'-bis(phenylacetyl)indigo synthesized in the same manner as in Example 1 to form a uniform solution. In FIG. 2 were shown the molar extinction coefficients at various wavelengths, of each of trans- and cis-N,N'-bis(phenylacetyl)indigo as determined in benzene.

Then, in the same manner as in Example 1, the heat of isomerization and the thermal isomerization rate (at 17° C.) of N,N'-bis(phenylacetyl)indigo (in benzene) were determined. It was found that the heat of isomerization was 51 KJ/mol (25 cal/g), the reaction constant (k) of the thermal isomerization reaction was $1.06 \times 10^{-4}$ sec$^{-1}$, and the half-life period was about 109 minutes.

As can be seen above, N,N'-bis(phenylacetyl)indigo, when dissolved in benzene, showed only about the same value of heat of isomerization as those of previously known N,N'-diacylindigos, and moreover showed a thermal isomerization rate rather somewhat higher than those of known N,N'-diacylindigos.

Thus, the energy storage characteristics of a material using the same N,N'-bis(phenylacetyl)indigo vary widely depending on whether acetonitrile is used or benzene is used as the solvent. The reason for this is considered that, when a polar solvent such as represented by acetonitrile is used as the solvent, some interaction is exercised between N,N'-bis(phenylacetyl)indigo and the polar solvent, resulting in changes in the ground state and the energy level of excited state of each of trans- and cis-N,N'bis(phenylacetyl)indigo.

EXAMPLE 2

Into 1 l of propionitrile, was dissolved 0.150 g of N,N'-bis(phenylacetyl)indigo synthesized in the same manner as in Example 1 to form a uniform solution. Then in the same manner as in Example 1, the heat of isomerization and the thermal isomerization rate (at 17° C.) of N,N'-bis(phenylacetyl)indigo (in propionitrile) were determined. It was found that the heat of isomerization was 112 KJ/mol (53.8 cal/g), the reaction constant (k) of the thermal isomerization reaction was $1.030 \times 10^{-5}$ sec$^{-1}$, and the half-life period was 1 122 minutes.

EXAMPLE 3

Into 1 l of nitromethane, was dissolved 0.121 g of N,N'-bis(phenylacetyl)indigo synthesized in the same manner as in Example 1 to form a uniform solution. Then, the heat of isomerization and the thermal isomerization rate of N,N'-bis(phenylacetyl)indigo (in nitromethane) were determined in the same manner as in Example 1. The results showed that the heat of isomerization was 114 KJ/mol (54.7 cal/g), the reaction constant (k) of the thermal isomerization reaction was $1.371 \times 10^{-5}$ sec$^{-1}$, and the half-life period was about 843 minutes.

EFFECT OF THE INVENTION

As described above, this invention provides a solar energy storage material comprising N,N'-bis(phenylacetyl)indigo dissolved in a polar solvent and enables it to store 50 cal or more of energy per 1 g of N,N'-bis(phenylacetyl)indigo and also to reduce greatly the thermal isomerization rate.

What is claimed is:

1. A solar energy storage material comprising N,N'-bis(phenylacetyl)indigo dissolved in a polar solvent.

2. A solar energy storage material according to claim 1, wherein said polar solvent is one or a mixture of two or more of the polar solvents selected from the group consisting of water, methanol, ethanol, phenol, acetone, methyl ethyl ketone, butyl methyl ketone, ethyl acetate, acetonitrile, propionitrile, benzonitrile, benzaldehyde, nitromethane, nitrobenzene, acetyl chloride, ethyl bromide, ethyl iodide, chlorobenzene, aniline, pyridine and ethylene cyanide.

3. A solar energy storage material according to claim 1, wherein said polar solvent is acetonitrile.

* * * * *